(12) United States Patent
Botman et al.

(10) Patent No.: US 12,174,755 B2
(45) Date of Patent: Dec. 24, 2024

(54) TECHNIQUE FOR CONSTRAINING ACCESS TO MEMORY USING CAPABILITIES

(71) Applicant: Arm Limited, Cambridge (GB)

(72) Inventors: François Christopher Jacques Botman, Cambridge (GB); Thomas Christopher Grocutt, Cambridge (GB); Bradley John Smith, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/247,400

(22) PCT Filed: Aug. 11, 2021

(86) PCT No.: PCT/GB2021/052078
§ 371 (c)(1),
(2) Date: Mar. 30, 2023

(87) PCT Pub. No.: WO2022/096844
PCT Pub. Date: May 12, 2022

(65) Prior Publication Data
US 2023/0409494 A1    Dec. 21, 2023

(30) Foreign Application Priority Data
Nov. 5, 2020 (GB) .................. 2017499

(51) Int. Cl.
*G06F 12/14*    (2006.01)
*G06F 21/56*    (2013.01)
(52) U.S. Cl.
CPC ........ *G06F 12/1491* (2013.01); *G06F 21/566* (2013.01); *G06F 2221/034* (2013.01)
(58) Field of Classification Search
CPC ............... G06F 12/1491; G06F 21/566; G06F 2221/034
See application file for complete search history.

(56) References Cited

U.S. PATENT DOCUMENTS

2002/0174278 A1*  11/2002  Komatsu ............. G06F 21/6218
                                                          710/107
2020/0133710 A1    4/2020  Barnes
2020/0159888 A1    5/2020  Ghose

FOREIGN PATENT DOCUMENTS

GB          2572151 A    9/2019
GB          2578135 A    4/2020

OTHER PUBLICATIONS

Robert Bedichek, "Some Efficient Architecture Simulation Techniques", 1990, Department of Computer Science, FR-35, University of Washington, Seattle, Washington 98195.

* cited by examiner

*Primary Examiner* — Jae U Yu
(74) *Attorney, Agent, or Firm* — NIXON & VANDERHYE P.C.

(57) ABSTRACT

An apparatus and method for constraining access to memory using capabilities. Processing circuitry performs operations during which access requests to memory are generated, with memory addresses for the access requests being generated using capabilities that identify constraining information. Capability checking circuitry performs a capability check operation to determine whether a given access request whose memory address is generated using a given capability is permitted based on the constraining information. Memory access checking circuitry then further constrains access to the memory by the given access request in dependence on a level of trust. The given capability has a capability level of trust associated therewith, and the level of trust associated with the given access request is dependent on both the current mode level of trust associated with the current mode of operation of the processing circuitry, and the capability level of trust of the given capability.

20 Claims, 14 Drawing Sheets

A) SET  PR1 = 140000  ⟶ trigger error

B) SET  PR1 = 140000

LD  R5, PR1  ⟶ trigger error

TECHNIQUE FOR CONSTRAINING ACCESS TO MEMORY USING CAPABILITIES

This invention was made with Government support under Contract Number HR001118C0016 awarded by the Defense Advanced Research Projects Agency (DARPA). The Government has certain rights in this invention.

BACKGROUND

The present technique relates to the field of data processing, and more particularly to the constraining of access to memory using capabilities.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

A number of capability storage elements (for example registers) may be provided for storing capabilities for access by the processing circuitry of a data processing apparatus. Each capability can include a number of permission flags identifying one or more permissions associated with the capability, for example to restrict the types of operation that can be performed when using the capability. For instance, considering a bounded pointer within such a capability storage element, this may provide information used to identify a non-extendible range of memory addresses accessible by the processing circuitry when using that capability, along with one or more permission flags identifying associated permissions. Whilst the processing circuitry may be allowed, at least when operating in a particular mode of operation, to take steps to reduce the range and/or clear permission flags associated with any particular bounded pointer available to it, it cannot typically extend the range, or set permission flags, in order to seek to increase the capability afforded to the processing circuitry by that bounded pointer, as this could compromise the security benefits obtained by virtue of using capabilities.

It would be desirable to provide more flexibility in how capabilities are managed whilst seeking to inhibit the ability to circumvent certain security measures implemented using capabilities.

SUMMARY

In a first example arrangement, there is provided an apparatus comprising: processing circuitry to perform operations during which access requests to memory are generated, wherein the processing circuitry is arranged to generate memory addresses for the access requests using capabilities that identify constraining information; capability checking circuitry to perform a capability check operation to determine whether a given access request whose memory address is generated using a given capability is permitted based on the constraining information identified by that given capability; and memory access checking circuitry to further constrain access to the memory by the given access request in dependence on a level of trust associated with the given access request; wherein: the given capability has a capability level of trust associated therewith, and the level of trust associated with the given access request is dependent on both a current mode level of trust associated with a current mode of operation of the processing circuitry, and the capability level of trust of the given capability.

In a further example arrangement, there is provided a method of constraining access to memory, comprising: employing processing circuitry to perform operations during which access requests to memory are generated, wherein the processing circuitry generates memory addresses for the access requests using capabilities that identify constraining information; performing a capability check operation to determine whether a given access request whose memory address is generated using a given capability is permitted based on the constraining information identified by that given capability; and further constraining access to the memory by the given access request in dependence on a level of trust associated with the given access request, wherein the given capability has a capability level of trust associated therewith, and the level of trust associated with the given access request is dependent on both a current mode level of trust associated with a current mode of operation of the processing circuitry, and the capability level of trust of the given capability.

In a still further example arrangement, there is provided a computer program for controlling a host data processing apparatus to provide an instruction execution environment, comprising: processing program logic to perform operations during which access requests to memory are generated, wherein the processing program logic is arranged to generate memory addresses for the access requests using capabilities that identify constraining information; capability checking program logic to perform a capability check operation to determine whether a given access request whose memory address is generated using a given capability is permitted based on the constraining information identified by that given capability; and memory access checking program logic to further constrain access to the memory by the given access request in dependence on a level of trust associated with the given access request; wherein: the given capability has a capability level of trust associated therewith, and the level of trust associated with the given access request is dependent on both a current mode level of trust associated with a current mode of operation of the processing program logic, and the capability level of trust of the given capability. A computer readable medium may be provided for storing such a computer program, and the computer readable medium may be in a non-transitory or a transitory form.

In a yet further example arrangement, there is provided an apparatus comprising: processing means for performing operations during which access requests to memory are generated, wherein the processing means is arranged to generate memory addresses for the access requests using capabilities that identify constraining information; capability checking means for performing a capability check operation to determine whether a given access request whose memory address is generated using a given capability is permitted based on the constraining information identified by that given capability; and memory access checking means for further constraining access to the memory by the given access request in dependence on a level of trust associated with the given access request; wherein: the given capability has a capability level of trust associated therewith, and the level of trust associated with the given access request is dependent on both a current mode level of trust associated with a current mode of operation of the processing means, and the capability level of trust of the given capability.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
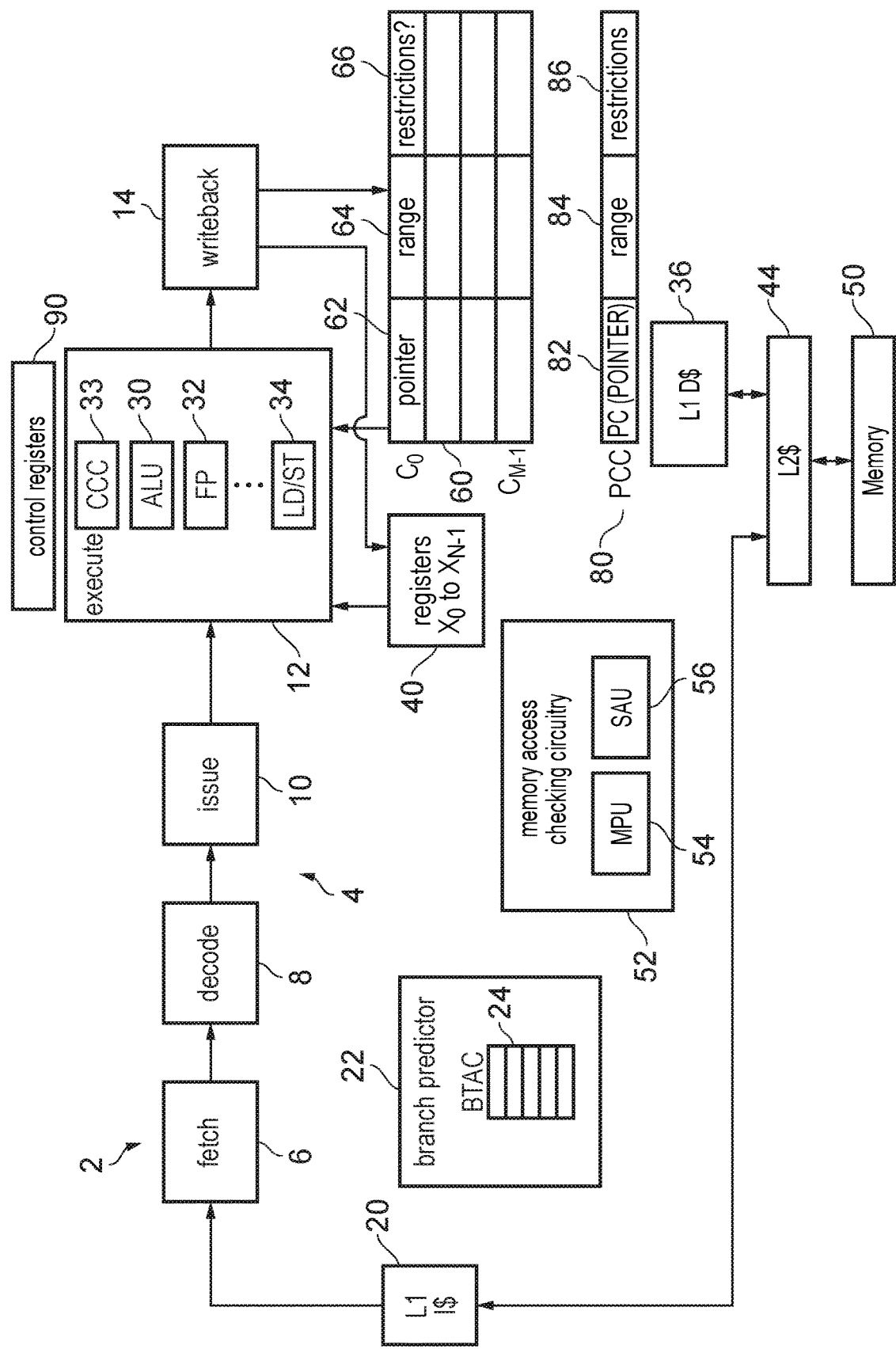
FIG. 1 is a block diagram of an apparatus in accordance with one example implementation.

In accordance with the techniques described herein, an apparatus is provided that has processing circuitry for performing operations during which access requests to memory are generated. The processing circuitry is arranged to generate memory addresses for the access requests using capabilities that identify constraining information. The memory address generated by the processing circuitry may be a virtual address in systems where address translation is performed, or alternatively may be a physical address in systems that do not support address translation.

The apparatus also has capability checking circuitry for performing a capability check operation to determine whether a given access request whose memory address is generated using a given capability is permitted based on the constraining information identified by that given capability. The capability checking circuitry can be a separate component to the processing circuitry, or alternatively may be provided within the processing circuitry of the apparatus.

There are a number of ways in which the constraining information can be identified by the associated capability. For example, the capability might directly contain the constraining information in one example implementation. However, in an alternative implementation, the capability may instead indicate (directly or indirectly) a location in memory where the constraining information is located.

The apparatus additionally has memory access checking circuitry to further constrain access to the memory by the given access request in dependence on a level of trust associated with the given access request. The memory access checking circuitry can take a variety of forms, for example a memory management unit (MMU), a memory protection unit (MPU), a security attribute unit (SAU), or a combination of those components. Prior to the techniques described herein, such memory access checking circuitry would typically be arranged to consider the level of trust associated with the current mode of operation of the processing circuitry when further constraining access to memory, rather than associating any particular level of trust with individual access requests. However, in accordance with the techniques described herein, the given capability has a capability level of trust associated therewith, and that information can also be factored into the checks performed by the memory access checking circuitry. In particular, in accordance with the techniques described herein, the level of trust associated with the given access request is dependent on both a current mode level of trust associated with the current mode of operation of the processing circuitry, and the capability level of trust of the given capability.

As will be discussed in more detail later, by providing a capability level of trust in association with individual capabilities, this can enhance the ways in which capabilities can be managed and used. For example, since as discussed above the capability level of trust will be taken into account by the memory access checking circuitry when determining whether to allow an access to memory specified by a given access request to proceed or not, a mechanism can be provided to allow capabilities to be generated by the processing circuitry in certain circumstances, with the capability level of trust associated with a particular capability effectively being used to then track the provenance of that capability, and to constrain accesses subsequently made using that capability.

In addition, such a mechanism further enables particular use-case protections to be supported, for example to combat a confused deputy attack. A confused deputy attack can occur when less privileged code passes a pointer to more privileged code, seeking to use the more privileged code to perform certain operations on its behalf. Through use of the capability level of trust, this can prevent the more privileged code from accidentally using pointers created by the unprivileged code that maliciously address an area of memory that should not be accessible to the non-privileged code. In particular, in such situations the pointer will have been generated using a capability whose capability level of trust does not exceed that of the unprivileged code, and hence even if the access is attempted from the privileged code the memory accessing circuitry will prevent the access to privileged memory due to the capability level of trust of the capability that was used to generate the pointer.

The above described techniques can be used in a wide variety of different systems. For instance, the processing circuitry can take a variety of forms. For example, the processing circuitry may be a central processing unit (CPU) that is arranged to execute program code in various different modes of operation, but the techniques can also be applied in relation to other forms of processing circuitry, for example a direct memory access (DMA) controller, an encryption accelerator, etc.

There are a number of ways in which the level of trust associated with the given access request can be determined based on both the current mode of operation of the processing circuitry and the capability level of trust of the given capability. For example, the system could be based on the granting of permissions or the restricting of permissions, and the level of trust associated with the given access request may be dependent on which of those techniques is used. However, in accordance with one example implementation, the technique is based on the restriction of permissions, and the level of trust associated with the given access request is constrained to be whichever of the current mode level of trust and the capability level of trust represents a lower level of trust.

There are a number of ways in which the capability level of trust can be specified for a capability, but in one example implementation the capability level of trust is encoded within the given capability. This can be implemented in a variety of ways, but in one example implementation, for each capability the constraining information provides at least a set of permissions identifying various types of memory accesses permitted to memory addresses generated using that capability, and the capability level of trust is provided as an additional permission.

However, whilst in the example implementation described above the capability level of trust is encoded within the given capability, it should be noted that this is not a requirement, and other mechanisms may be provided for associating a capability level of trust with a given capability. For example, in an alternative implementation the given capability may provide an identifier indicative of a location containing the capability level of trust. Hence, in such an implementation the capability level of trust information can reside elsewhere, for example in memory, with the capability itself containing a value that is indicative of the location of metadata providing the capability level of trust. The identifier used to indicate the location containing the capability level of trust can take a variety of forms. For example it could be an offset from an address stored in a global register of the system, hence enabling a memory address to be determined identifying where in memory the capability level of trust is maintained. Alternatively, the identifier might directly identify the location in memory in which the capability level of trust information is stored.

The constraining information provided within each capability can take a variety of forms, but in one example implementation further provides bounds information used to determine an allowable range of memory addresses for the memory address generated for any access request using that capability. In one example implementation, the constraining information can comprise both such bounds information and also a set of permissions identifying types of memory accesses permitted to memory addresses generated using that capability. The capability can also contain other information, for instance a pointer value that is used when generating a memory address, for example by adding that pointer value to some offset in order to generate the memory address. The generated memory address can then be compared against the bounds information to determine whether the generated memory address is within the allowable range.

In one example implementation, the processing circuitry comprises capability generating circuitry arranged, at least when the current mode level of trust exceeds a threshold level of trust, to perform a capability generation operation to generate a capability and to set the associated capability level of trust for the generated capability to indicate a level of trust lower than the current mode level of trust. Hence, in such an example implementation the processing circuitry can be given limited forging rights to create capabilities that can then be used within the system. However, when performing such capability generation operations, the processing circuitry will be constrained so that the associated capability level of trust indicates a level of trust lower than the current mode level of trust, thus preventing the processing circuitry in its current mode of operation from generating capabilities for itself to use in that current mode of operation. Instead, any generated capability will be for use in one or more modes of operation having a lower level of trust than the current mode level of trust used when generating that capability.

The above capability generating abilities may be restricted to one or more particular mode level of trusts, so that the processing circuitry can only generate capabilities when in those one or more particular modes of operation. However, alternatively such capability generating techniques can be supported for any mode level of trust other than the lowest level of trust supported when using capabilities.

Whilst in the above example implementation the capability generating functionality can be restricted to one or more mode levels of trust, and results in the capability level of trust associated with the generated capability being set lower than the current mode level of trust, in an alternative implementation the capability generating functionality may be supported in a different manner. For example, in one particular implementation the processing circuitry may comprise capability generating circuitry arranged to perform a capability generation operation to generate a capability from source data, provided the current mode level of trust exceeds a capability level of trust indication provided in association with the source data. Hence, the source data from which the capability is generated may have a capability level of trust indication provided in association with it, and the capability generating circuitry may be allowed to perform the capability generation operation provided the current mode level of trust exceeds that capability level of trust indication. If this is not the case, then the generation of a valid capability can be prevented. This can be achieved in a variety of ways, for example by preventing a control value provided in association with the capability from being set to identify the capability as a valid capability (such a control value also being referred to herein as a tag value), or by raising a fault.

In one example implementation the processing circuitry may be arranged to execute program instructions, with the processing of the program instructions being constrained by a prevailing capability. The processing circuitry may further comprise control flow change handling circuitry that is used to perform a control flow change operation, the control flow change operation defining a control flow change target address indicating the address of a program instruction for execution after the control flow change operation. In such implementations the earlier-mentioned capability generating circuitry can be used to generate a capability for use as a next prevailing capability. In particular, the capability generating circuitry may be arranged to determine, in dependence on the control flow change target address, an address at which capability constraining information is stored. That capability constraining information can then be retrieved and used to generate a capability to form the next prevailing capability. That next prevailing capability can be generated in dependence upon at least the capability constraining information, and can have an associated capability level of trust that is constrained to indicate a level of trust lower than the current mode level of trust. Hence, the generated capability can have its associated level of trust demoted as necessary based on the current mode level of trust (i.e. the level of trust in place prior to the branch taking place).

It should also be noted that in such implementations the current mode level of trust of the processing circuitry can be further constrained by the level of trust associated with the prevailing capability. This, for example, can ensure that when an unprivileged capability is used to generate program counter values, this will never allow execution of privileged code. Hence, in such an implementation the mode level of trust of the processing circuitry can then be constrained to be the lowest of either the current execution level of trust inherent to the current mode of execution (for example dependent on whether the processing circuitry is operating in a secure domain or a less secure domain and/or within a privileged state or an unprivileged state) and the capability level of trust set for the program counter capability used to execute the current code.

The capabilities can be stored in a variety of locations within the system. For example, the apparatus may have a set of capability registers that are used to store capabilities for reference by the processing circuitry, but may also have memory circuitry that can be used to store one or more capabilities. The processing circuitry may be arranged to perform a load operation in order to load a chosen capability from the memory circuitry into a selected capability register from the set of capability registers. During this process, the processing circuitry may be arranged to selectively modify the capability level of trust such that the chosen capability as stored into the selected capability register has a capability level of trust constrained not to exceed the current mode level of trust or the capability level of trust of the chosen capability as stored in the memory circuitry. Hence, whilst the original version of the capability that may still be retained within the memory circuitry will not have its associated capability level of trust altered, the version as stored into the capability register can have its capability level of trust altered by the processing circuitry during the load operation, so as to constrain that capability level of trust, and hence constrain subsequent memory access operations performed using that loaded capability in dependence on the capability level of trust of that capability as stored within the capability register.

In some implementations the load operation may be performed in some instances to load ordinary data (rather than a capability) into a capability register, and in such instances it may be important that the bits in the data that would be associated with the capability level of trust were that data in fact a capability are not modified, since in this case it is not a capability that is being handled and modifying those bits would corrupt the data. Accordingly, in one example implementation the processing circuitry may be arranged to only selectively modify the capability level of trust during the load operation when the chosen capability has a control value identifying that the chosen capability is a valid capability. By such an approach, the above described selective modification of the capability level of trust during the load operation will only be performed if in fact a capability is being loaded into the capability register.

There are a number of ways in which the capability level of trust can be constrained so as not to exceed the current mode level of trust or the capability level of trust of the chosen capability as stored in the memory circuitry. However, in one particular example implementation, when the current mode level of trust is less than the capability level of trust of the chosen capability as stored in the memory circuitry, the processing circuitry is arranged to demote the capability level of trust of the chosen capability as stored into the selected capability register to match the current mode level of trust.

Further, when the current mode level of trust is the same or greater than the capability level of trust of the chosen capability as stored in the memory circuitry, the processing circuitry may be arranged to leave unchanged the capability level of trust when the chosen capability is stored into the selected capability register. Hence, in this scenario the capability level of trust is unchanged during the load operation.

In one example implementation, at least when the current mode level of trust exceeds a threshold level of trust, the processing circuitry is arranged to allow the capability level of trust of a chosen capability to be reduced from its current capability level of trust. Hence, such a mechanism provides flexibility in how the generated capabilities are managed, and in particular can allow the capability level of trust to be demoted. By such a technique, it may be possible for program code executing on the processing circuitry, at least whilst the current mode level of trust exceeds the threshold level of trust (i.e. indicating that the current program code is sufficiently trusted), to demote the capability level of trust of one or more capabilities. In some implementations such functionality may be allowed irrespective of the current mode level of trust, or this ability to demote the capability level of trust could be restricted in a different way, for example in relation to a capability whose capability level of trust does not exceed the current mode level of trust.

In one example implementation, the apparatus may be provided with one or more initial capabilities whose capability level of trust indicates a highest level of trust supported by the apparatus when utilising capabilities. Such initial capabilities could for example be set prior to the apparatus entering a capability mode of operation where access requests are constrained by the capabilities. The initial capabilities could be defined in a variety of ways, but in one example implementation may be defined by a compiler used to compile the program code to be executed on the apparatus. Due to the earlier-described technique that can be employed when loading capabilities from memory, in particular the ability to selectively demote the capability level of trust in situations where the current mode level of trust is lower than the capability level of trust of the loaded capability, this can ensure correct operation even though the initial capability, when created, was given the highest level of trust supported by the apparatus when utilising capabilities.

Whilst in one example implementation all of the initial capabilities can be set to have a capability level of trust indicating a highest level of trust, if desired one or more of the initial capabilities could be created with a lower level of trust, for example if the developer knows that the capability should always be unprivileged.

The processing circuitry can be arranged to operate in a variety of different ways, with the current mode level of trust being dependent on how the processing circuitry is currently operating. For example, in one implementation the processing circuitry may be arranged to execute program code in one of a plurality of states comprising at least a privileged state and an unprivileged state, and the current mode level of trust may be dependent on which of the plurality of states the current program code is executed in. It should be noted that there may be two different states, namely the privileged state and the unprivileged state, or there could be N different states having different levels of privilege, where N is greater than 2, and in either of these scenarios the current mode level of trust can be set dependent on which state the current program code is executed in. For example, a specific implementation may provide, as the different states, different exception levels (ELs) such as EL0, EL1 and EL2, where EL2 is more privileged than EL1, and EL1 is more privileged than EL0.

Alternatively, or in addition, the processing circuitry may be arranged to execute program code in one of a plurality of security domains comprising at least a secure domain and a less secure domain, and the current mode level of trust may be dependent on which of the plurality of security domains the current program code is executed in. As with the processing states, there may be just two domains, namely a secure domain and a non-secure domain, or alternatively there may be M different domains, where M is greater than 2, each of the domains having a different level of security, and the current mode level of trust can then be set dependent on which of the security domains the current program code is executed in.

It should also be noted that the current mode level of trust can be set dependent on multiple different orthogonal levels of trust, and there may be more than two orthogonal levels of trust. Hence, for example, in one implementation the processing circuitry may be able to operate in both the different states and the different security domains discussed above, and the current mode level of trust can be set dependent on both of those factors.

In one example implementation, the capabilities may include at least one immutable capability whose constraining information is identified as immutable. Typically this would mean that the processing circuitry would not be able to change the constraining information once the capability has been established. However, in accordance with the techniques described herein, it is possible in certain situations to allow the constraining information of a chosen immutable capability to be modified. For example, in one implementation, at least when the current mode level of trust exceeds a threshold level of trust, the processing circuitry is arranged to allow the constraining information of a chosen immutable capability to be modified provided that chosen immutable capability has a capability level of trust less than the current mode level of trust. In some example implementations, there may be no need to check whether the current mode level of trust exceeds a threshold level of trust, and instead the constraining information of a chosen immutable capability may always be allowed to be modified provided that the chosen immutable capability has a capability level of trust less than the current mode level of trust.

In alternative implementations, the selective modification of immutable capabilities could be managed in a different way. For instance, whilst in the above example the modification operation on an immutable capability is not performed if the trust level criteria are not met, in an alternative implementation the modification could occur even if the trust level criteria is not met, but the tag bit may in that instance be cleared to effectively make the capability invalid. As a further alternative, the modification may be performed, but if required the capability level of trust could be demoted so that the above-mentioned trust criteria are met, i.e. the capability level of trust is then less than the current mode level of trust once the immutable capability has been changed. This then restricts the onward use of that modified immutable capability, or the processing circuitry may be arranged to raise a fault in such a situation.

It should be noted that there are a number of ways in which a capability can be identified as being immutable. In one example implementation, a bit may be specified in a capability to indicate (either directly or indirectly) whether the capability is immutable.

With reference to the earlier-described process of performing a load operation to load a capability from memory circuitry into a capability register, with the selective demotion of the capability level of trust of that capability when it is stored into the selected capability register, then when considering that process in the context of immutable capabilities, the processing circuitry may be configured to disable the demotion of the capability level of trust of the chosen capability when the chosen capability is an immutable capability. Such an approach would allow, for example, the spilling of privileged immutable capabilities from within an unprivileged mode without modifying the immutable capability.

In one example implementation, the processing circuitry is arranged to issue a fault signal when an attempt is made to perform the access identified by the given access request in a situation where the capability level of trust associated with the given capability exceeds the current mode level of trust. This can prevent the processing circuitry from seeking to use capabilities that are not intended for use by the processing circuitry when in its current mode of operation. There are various different actions that can be taken to trigger the fault. For example, the fault could be triggered based on checking of the generated address, or could be triggered before the address is even generated.

In one example implementation, when considering the earlier selective modification of a capability level of trust when a capability is loaded from memory into a capability register, then in one example implementation the chosen capability as stored into the selected capability register may be further constrained to have a capability level of trust not exceeding the capability level of trust associated with a capability that is used to generate the memory address for the load operation. Such an approach can be used to further constrain the capability level of trust associated with a capability loaded from memory into a capability register.

In one example implementation, when performing the earlier-mentioned loading of a capability from memory into a capability register, performance of the demotion of the capability level of trust of the chosen capability as stored into the selected capability register may be controlled in dependence on control information. This control information could be stored in the capability itself, for example within the capability being loaded, or indeed within the capability that is used to generate the memory address for the load operation. Alternatively, this control information could be stored in a separate control register. This latter scenario would allow, for example, MPU region attributes to be used to decide whether demotion should occur or not during the loading of capabilities into capability registers. Hence, purely by way of example, if the capability is loaded from an MPU region marked as read only (for example code memory), the demotion could be arranged to occur, but could be arranged not to occur if instead that region is marked as read-write (for example as used for a heap or stack).

Particular examples will now be described with reference to the figures.

The techniques described herein can be employed in a variety of data processing systems, and in association with different types of processing circuitry within such systems. For example the techniques can be used in association with processing circuitry taking the form of a central processing unit (CPU), but could alternatively be employed in association with other processing circuitry, such as a direct memory access (DMA) controller, an encryption accelerator, etc. Purely by way of illustrative example in the following FIG. 1, a processing pipeline of a CPU will be considered as an example of processing circuitry within which the described techniques can be used.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some example implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (ops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some example implementations may support in-order processing so that instructions are issued for execution in an order corresponding to the program order in which instructions were fetched from the L1 instruction cache 20. Other example implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer (TLB) may be provided (for example within memory access checking circuitry 52 to be described in more detail later) for translating the virtual addresses used by the pipeline 4 into physical addresses used for accessing the cache or memory. For example, the TLB may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some example implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While a single level TLB may be used, it will be appreciated that a hierarchy of TLBs may instead be provided so that a level one (L1) TLB may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in an alternative example implementation the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an example implementation where the same physical storage is used for both general purpose data registers and bounded pointer registers, then in one example implementation the pointer value 62 may for example be stored within the same storage location as used for a corresponding general purpose register.

Figure 2:
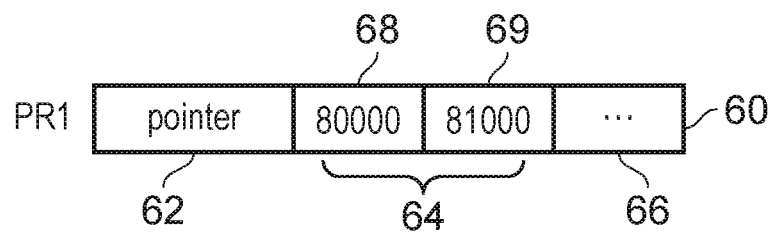
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
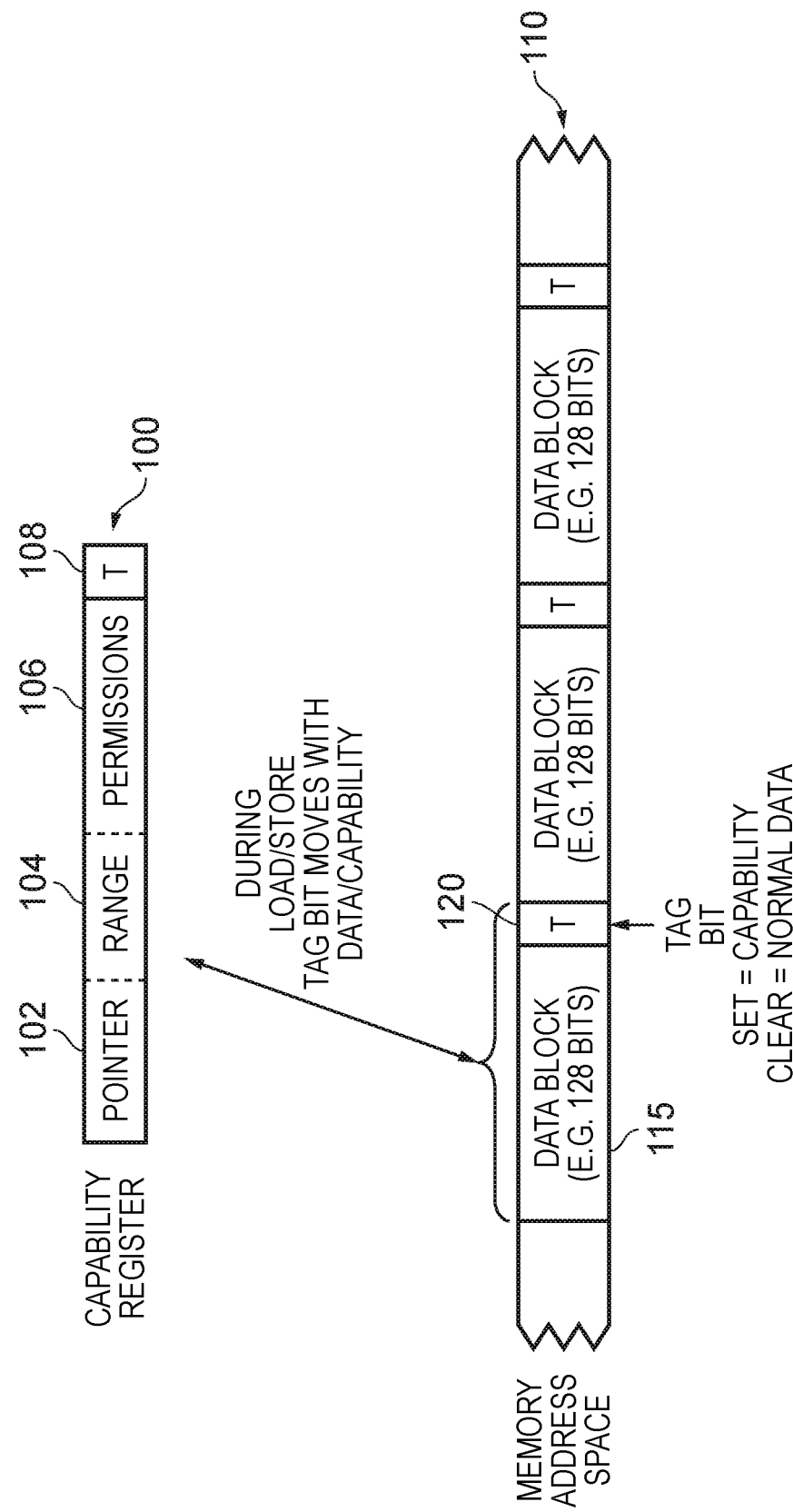
FIG. 3 illustrates the use of a tag bit in association with bounded pointers, in accordance with one example implementation.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits, but in other example implementations different sized data blocks may be used, for example 64-bit data blocks when capabilities are defined by 64 bits of information. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on example implementation, but purely by way of illustration, in one example implementation if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Returning to FIG. 1, the apparatus 2 may be provided with capability checking circuitry 33 that can perform a capability check operation in association with a given access request whose memory address is generated using a given capability, in order to determine whether that access request is permitted based on the constraining information identified by the capability. This can for example be performed with reference to the range information and restriction/permission information discussed earlier, which collectively may be referred to as the constraining information of the capability. Hence, purely by way of example, if a write access request to a memory address is seeking to be performed using a capability that indicates that the capability can only be used for reads but not writes, then the capability checking circuitry 33 may determine that the access request cannot proceed, and may for example issue a fault signal under such circumstances.

However, assuming the capability check operation is passed, then the memory access request may be propagated on to memory access checking circuitry 52 which can provide some further checks to ensure that the access is allowed to proceed. For example, the processing circuitry may be able to operate in multiple different modes of operation, and each mode of operation may for example be associated with a certain state of privilege, and/or with a particular security domain in which the apparatus is operating, and certain regions of memory may only be accessible when the processing circuitry is operating in one or a subset of the possible modes of operation.

The memory access checking circuitry 52 can hence check whether accesses to the memory system are permitted based on attribute data specified for various regions of a memory address space. The memory access checking circuitry may include a security attribute unit (SAU) 56 for storing security domain defining data which defines a security domain associated with each respective region of the memory address space. Based on the security attribute data, the security attribute unit 56 may check whether a memory access is allowed depending on a current security domain of operation of the processing circuitry and on the security domain associated with the region including the target address and the memory access. In other implementations the SAU 56 may not directly store the security domain defining data, but instead may access security defining data stored elsewhere in order to perform the memory access checks. In some systems the security domain defining data may be stored in the memory system 50, or may be stored in configuration registers elsewhere in the system 2.

The processing circuitry 4 may operate in a current security domain of operation, which may generally correspond to the security domain associated with the address of the instruction currently being executed (although there may be some exceptions, e.g. when handling transitions between domain). Whilst operating in a secure domain, the processing circuitry may have access to data in memory regions associated with both the secure domain and a less secure domain, whilst when operating in a less secure domain the processing circuitry may have access to the data in regions associated with the less secure domain but may not be permitted to access data in regions of the address space which the SAU 56 specifies as being associated with the secure domain. This enables protection of sensitive data against unauthorised access from code operating in the less secure domain. As will be discussed in more detail herein, when the SAU 56 is performing such checks to determine whether an access can proceed, it considers not only the current security domain of the processing circuitry, but finer grained information associated with the individual access request being considered. This finer grained information is based both on the security domain of the processing circuitry, and a level of trust indication associated with the capability that is used to generate the memory address of the access request.

As also shown in FIG. 1, the memory access checking circuitry 52 may include a memory protection unit (MPU) 54 which checks whether memory accesses to the memory system 50 satisfy access permissions which may specify, for example, which privilege levels of the processing circuitry 4 are allowed to access a given region of memory, or may specify whether a memory region of the address space can be accessed by both read and write operations or is a read only region for which writes are prohibited. The access permissions used by the MPU 54 may for example be specified by a more privileged process (such as a hypervisor or an operating system) to control which regions of memory a less privileged process (such as an application) is allowed to access, and how (read only or read/write). The permissions provided by the MPU 54 may be orthogonal to those provided by the SAU 56, so that for a given memory access request to be allowed, it should pass the checks based on the access permissions defined for both the MPU 54 and the SAU 56. Although the MPU 54 is shown as a single entity in FIG. 1, in some examples separate secure and less secure MPUs may be provided, each associated with one of the security domains, so that different memory access permissions can be specified for a given region of memory depending on whether the current domain is the secure domain or the less secure domain (e.g. a region could be read only in the less secure domain but both readable and writeable in the secure domain).

As with the earlier discussion of the SAU, when the MPU is performing its access permission checks, it can take into account a level of trust associated with the given access request, which is dependent not only on the current mode of operation of the processing circuitry, but also a capability level of trust associated with the capability that is used to generate the memory address.

One or more control registers 90 may be provided to store enable/disable flags for certain features provided by the implementation described herein. By way of specific example, it may be possible for immutable capabilities having a lower level of trust than the level of trust of the current mode of operation of the processing circuitry to selectively be modified, but this behaviour can be controlled by a separate bit within the control registers 90. Similarly, a fault may be raised when seeking to dereference a capability with a higher level of trust associated therewith from within a less privileged mode of operation of the processing circuitry, and again such functionality could possibility be gated by an enable control bit within the control registers 90. As will also be discussed later, capabilities may be loaded from memory into capability registers, and during this process the associated level of trust of the capability being loaded may selectively be demoted, but again such functionality could be controlled by a separate control bit in the control registers 90.

Figure 4:
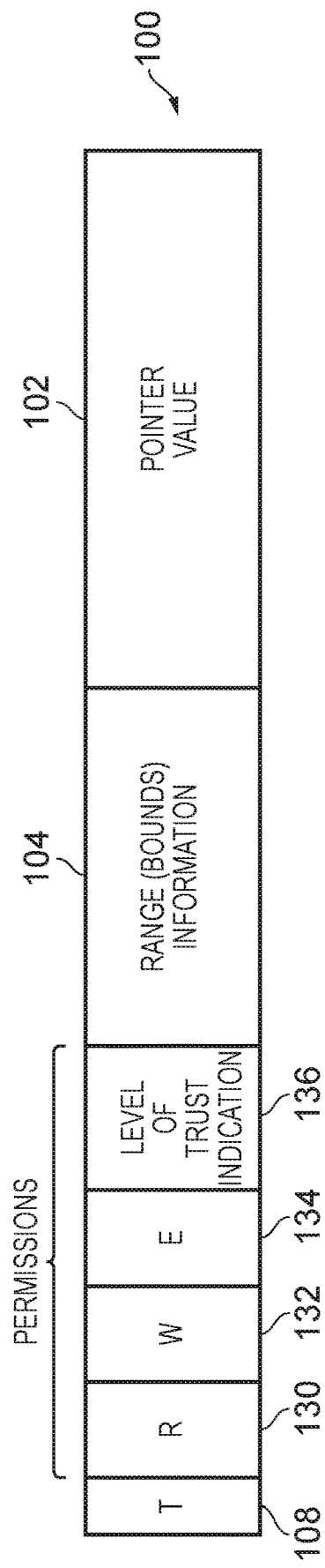
FIG. 4 schematically illustrates the form of a capability that may be used in accordance with the techniques described herein, where a level of trust indication is provided in association with the capability.

In accordance with the techniques described herein, capabilities are provided with associated capability level of trust information, and that level of trust indication can be factored into the memory access checking procedures implemented by the memory access checking circuitry 52. There are various ways in which this level of trust indication may be provided in association with a capability, but FIG. 4 illustrates one example implementation. In the example shown in FIG. 4, the capability 100 contains a pointer value 102 and some range information 104 (also referred to herein as bounds information). A set of permissions can also be provided within the capability, along with the earlier-described tag bit 108 which can be set or cleared to identify whether the corresponding block of data is to be treated as a capability or not.

Permissions specified for the capability can vary dependent on implementation, but in one example implementation the permissions include a read permission bit whose value indicates whether the capability can be used to generate memory addresses for read accesses, a write permission bit whose value indicates whether the capability can be used to generate memory addresses for write accesses, and an execute permission bit whose value indicates whether the capability can be used to generate memory addresses of instructions to be fetch and executed. Other information can be identified within the capability, for example to indicate whether the capability is considered immutable or not. Whilst such information can be directly specified as extra information in the capability, it can in some example implementations be inferred from the state of other information already provided within the capability. For example, in one particular implementation, when the execute bit is set, the capability is considered to be immutable, in that the information specified by the capability cannot be modified without clearing the tag bit (effectively invalidating the capability), except through the normal incrementing of pointer values that may result from instruction execution.

As shown in FIG. 4, in one example implementation the permissions fields are extended to provide a level of trust indication field 136, the level of trust indication identifying a level of trust associated with the capability 100. The level of trust can be directly encoded into the field 136 of the capability 100, or alternatively the level of trust indication field 136 can provide an identifier that is used to indicate a memory address containing the level of trust information. Such an identifier could directly indicate the memory location of the level of trust information, or it could for example specify an offset that can be applied to an address stored in a global register in the system in order to identify the location containing the level of trust information.

Figure 5A:
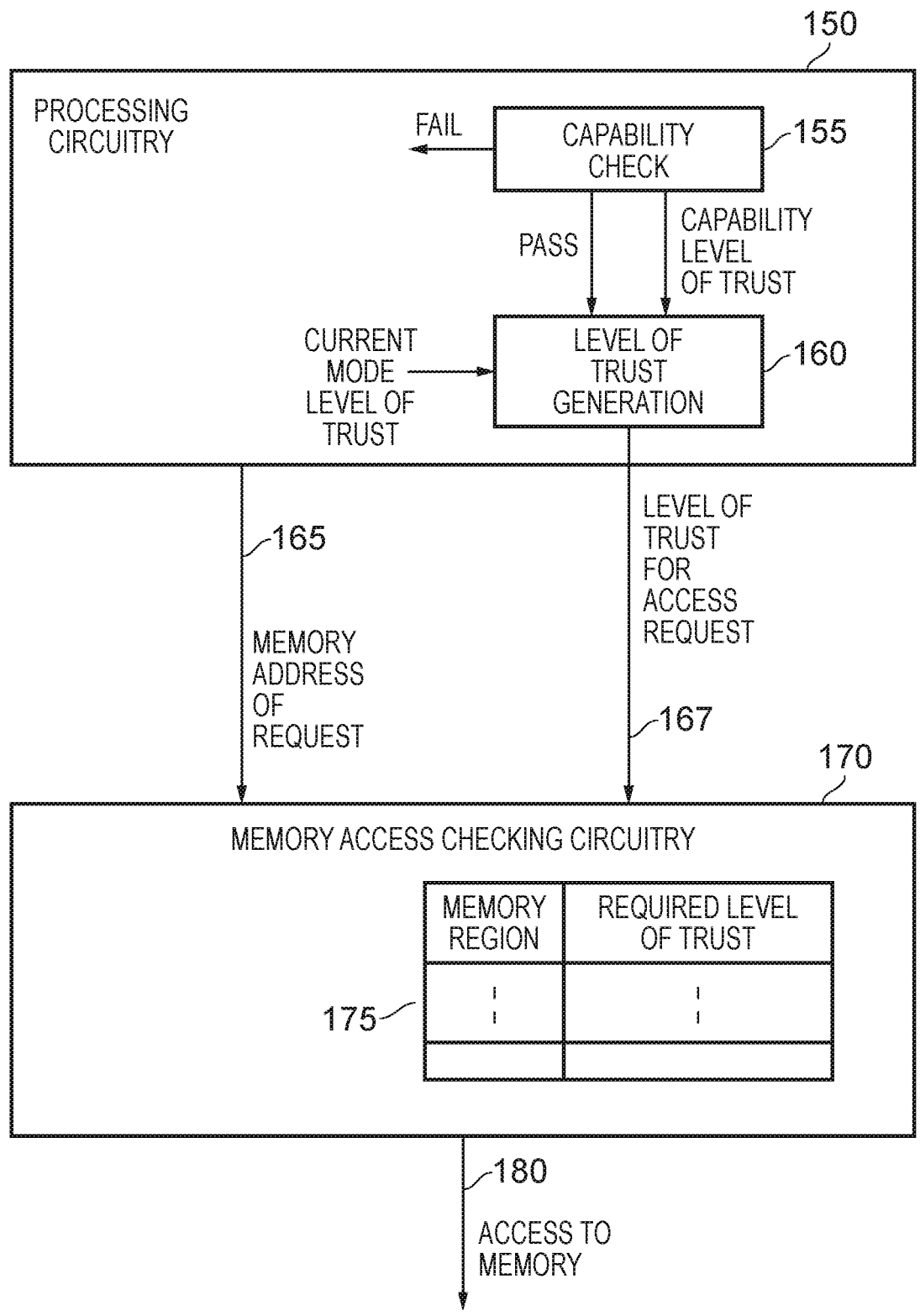
FIG. 5A is a diagram schematically illustrating how a level of trust for an individual access request may be generated and thereafter used to constrain access to memory, in accordance with one example implementation.

FIG. 5A is a block diagram schematically illustrating how the capability level of trust information is used to constrain accesses to memory, in accordance with one example implementation. In this example, the processing circuitry 150 includes a capability checking block 155 that can be used, when an access request is being considered whose memory address is generated using a given capability, to perform a capability check operation to determine whether that access request is permitted based on the constraining information identified by the given capability. Hence, the capability check may involve reference to the range and permission information of the capability in order to determine whether the access is allowed to proceed or not. In the event of a fail of the capability check, a failure indication can be provided to the processing circuitry, and this can take a variety of forms, for example a fault signal. However, if the capability check is passed, then this is indicated to a level of trust generation block 160, which also receives the capability level of trust information 136 of the capability 100.

In addition to the capability level of trust, the level of trust generation block 160 also receives an indication of the current mode level of trust, this being the level of trust associated with the current mode of operation of the processing circuitry. Both the capability level of trust and the current mode level of trust are then used in combination to form a level of trust for the access request, which is propagated over path 167 in association with the memory address of the request issued over path 165. There are various ways in which the level of trust generation block 160 can use both the current mode level of trust and the capability level of trust to decide on the level of trust for the access request, but in one example implementation the level of trust associated with the access request is constrained to be whichever of the current mode level of trust and the capability level of trust represents a lower level of trust.

The memory access checking circuitry 170 receives both the memory address of the request and the associated level of trust for the access request, and can perform a memory access checking operation with reference to stored access permission information 175 which can be specified for different memory regions. In particular, for each of a number of different memory regions, the access permission information can effectively indicate the required level of trust that needs to be provided for the access request in order to enable the access to proceed. If the level of trust for the access request received over path 167 does not meet the required level of trust, then the access can be caused to fail, whereas otherwise the access to memory can be propagated over path 180 from the memory access checking circuitry 170.

Figure 5B:
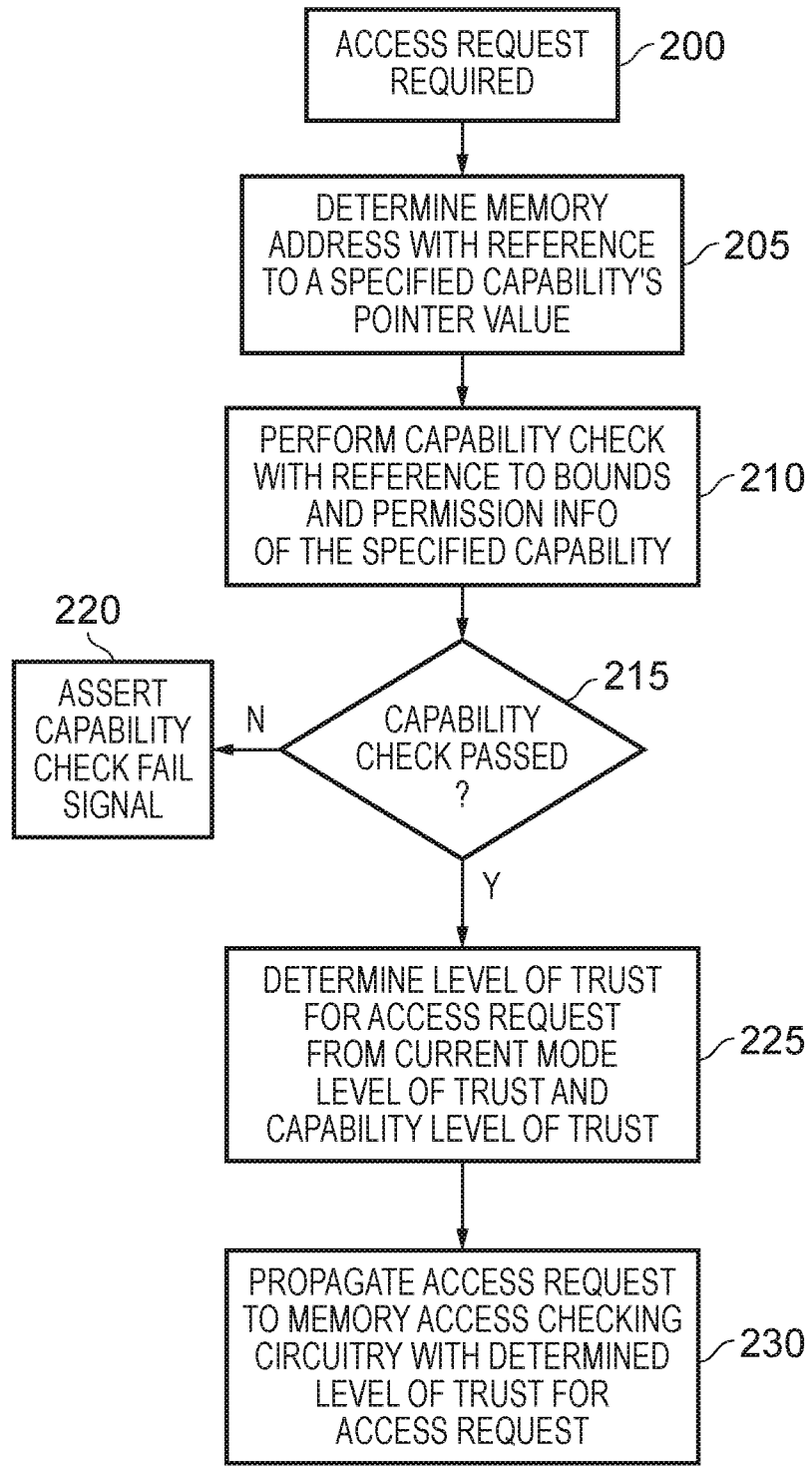
FIG. 5B is a flow diagram illustrating the operation of the apparatus schematically shown in FIG. 5A, in accordance with one example implementation.

FIG. 5B is a flow diagram illustrating the operation of the circuitry of FIG. 5A in one example implementation. At step 200 it is determined that an access request is required, and thereafter at step 205 the memory address for the access request is determined with reference to a specified capability's pointer value. At step 210 a capability check is then performed with reference to the bounds and permission information of the specified capability in order to determine whether the access can proceed.

Accordingly, at step 215 it is determined whether the capability check has been passed or not, and if not the process proceeds to step 220 where a capability check fail signal is asserted.

Typically when performing the capability check at step 210 the level of trust information is not used, but instead is retained for passing on to the memory access checking circuitry 170. However, in certain implementations the level of trust information can also be used during the capability checking process. For example, the processing circuitry may be arranged to issue a fault signal at step 220 when an attempt is made to perform an access identified by a given access request in a situation where the capability level of trust associated with the capability being used to generate the memory address for that access request exceeds the current mode level of trust associated with the current mode of operation of the processing circuitry. In particular, in some implementations it may be considered incorrect behaviour for a processing circuitry operating at a certain level of trust to seek to make use of a capability that has a higher capability level of trust.

If the capability check is determined to have been passed at step 215, then at step 225 the level of trust for the access request is determined by the level of trust generation block 160 based on both the current mode level of trust and the capability level of trust. Thereafter, at step 230 the access request is propagated to the memory access checking circuitry 170 with the determined level of trust for the access request, so that the memory access checking circuitry 170 can then perform access permission checks based on that indicated level of trust for the access request.

Figure 6A:
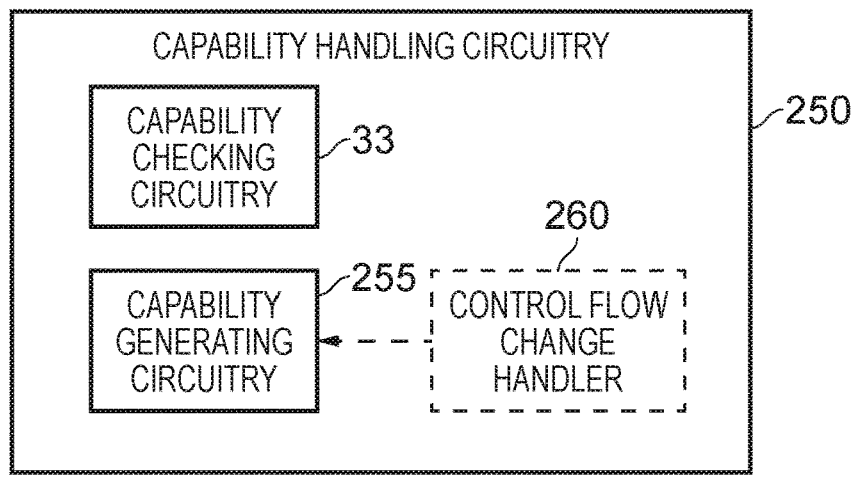
FIG. 6A is a block diagram schematically illustrating components that may be provided within capability handling circuitry in accordance with one example implementation.

FIG. 6A is a block diagram schematically illustrating capability handling circuitry 250 that may be provided within the apparatus in accordance with one example implementation, and in particular shows a number of different components that may be provided within the capability handling circuitry 250. The capability handling circuitry 250 may be provided as a separate component within the apparatus, or may be integrated within the processing circuitry in one example implementation.

The capability handling circuitry 250 includes the capability checking circuitry 33 discussed earlier, that is arranged to perform a capability check operation for an access request. In particular, the capability check operation is used to determine whether the memory address generated for that access request from a capability is permitted based on the constraining information identified by that capability.

As will be apparent from the earlier discussion, capabilities may be provided with a capability level of trust, and in one example implementation this allows for limited forging permissions to be given to the processing circuitry when operating in at least certain modes of operation, so as to allow capabilities to be generated. To enable the generation of capabilities, capability generating circuitry 255 may be provided, and in one example implementation the capability generating circuitry 255 may be arranged to operate as shown by the flow diagram of FIG. 6B. Hence, at step 265, it is determined whether a capability generation operation has been requested. Once it has been determined that a capability is desired to be generated, then at step 270 it is determined whether the current mode level of trust (i.e. the level of trust associated with the current mode of operation of the processing circuitry) exceeds a threshold level of trust, and, if not, at step 275 the capability generation operation fails. This can implemented in a variety of ways, but could take the form of an abort process in one example implementation. Alternatively, the process may proceed to allow the capability information to be generated, but with the tag bit being cleared, thus generating an invalid capability.

However, if at step 270 it is determined that the current mode level of trust exceeds the threshold level, and hence the generation of capabilities by the processing circuitry is in principle allowed, the process proceeds to step 280 where the required capability information is obtained, and the capability then constructed using that information. The capability information can be obtained in a variety of ways, but could for example be retrieved from a location in memory identified by the capability generation request. Further, at step 285 it is ensured that if a valid capability is produced, the capability level of trust is set to be less than the current mode level of trust. This requirement can be enforced in a variety of ways. For example, the capability generating circuitry 255 may be arranged to only set the tag bit of the generated capability information if the capability level of trust is less than the current mode level of trust, and if this is not the case the tag bit will not be set and an invalid capability will have been produced. Alternatively, the capability generating circuitry 255 could be arranged to always set the tag bit for the generated capability, but to demote the capability level of trust if required so that the condition set in step 285 is met.

Figure 6B:
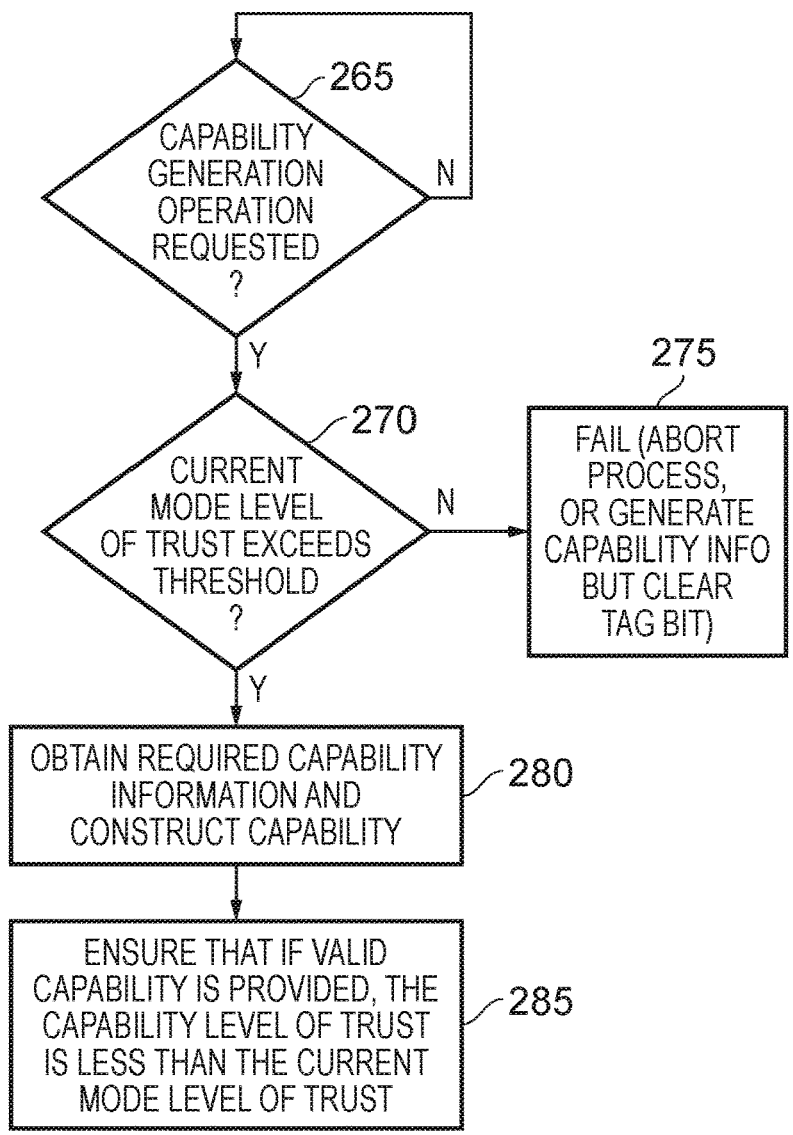
FIG. 6B is a flow diagram illustrating the performance of a capability generation operation in accordance with one example implementation.

Through use of the process illustrated in FIG. 6B, the processing circuitry can, at least when in certain modes of operation, be allowed to create capabilities, but when doing so the processing circuitry will be constrained so that the associated capability level of trust for the generated capability is less than the current mode level of the processing circuitry, thus preventing the processing circuitry in its current mode of operation from generating capabilities that could be used in that current mode of operation.

The threshold level of trust assessed at step 270 could be set in a variety of ways, and could for example be used to restrict use of the capability generating functionality to one or a small subset of the possible mode levels of trust of the processing circuitry. Alternatively, such capability generating techniques could be supported for any mode level of trust other than the lowest level of trust supported when using capabilities.

Whilst FIG. 6B illustrates one mechanism that could be used by the capability generating circuitry 255 to allow the generation of capabilities in certain situations, other mechanisms could be used if desired. For example, when it is determined that a capability generation operation is required, then the capability generating circuitry 255 may be allowed to generate a capability from specified source data, provided that the current mode level of trust exceeds a capability level of trust indication provided in association with that source data. If such a condition is not met, then the capability generation operation will fail, for example by issuing an abort, or by clearing the tag bit of any generated capability.

Returning to FIG. 6A, the capability handling circuitry 250 may optionally be provided with control flow change handling circuitry 260 that can interact with the capability generating circuitry 255 to cause capabilities to be generated on the occurrence of a change in control flow within a program being executed on the processing circuitry. In particular, the processing circuitry may be arranged to execute program instructions, with the processing of the program instructions being constrained by a prevailing capability. When a control flow change operation is performed, a target address will be identified indicating the address of a program instruction for execution after the control flow change operation. In dependence on that control flow change target address, the capability generating circuitry 255 may be arranged to identify an address at which capability constraining information is stored, to retrieve that information, and to then generate a capability for use as a next prevailing capability using that capability constraining information. In such a situation, the associated capability level of trust for the generated capability could be constrained to indicate a level of trust lower than the current mode level of trust.

It should also be noted that the current mode level of trust of the processing circuitry can be further constrained by the level of trust associated with the prevailing capability. Such a mechanism could be useful, for example, in order to ensure that when an unprivileged capability is used to generate program counter values, this will not allow execution of privileged code.

Figure 7:
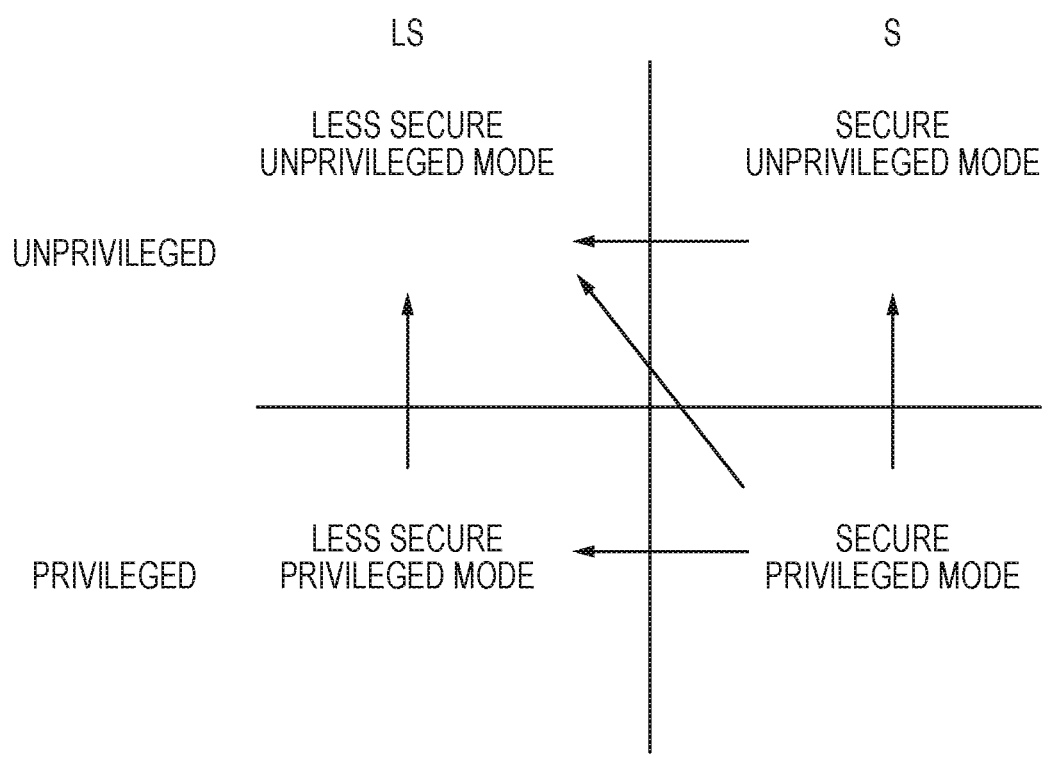
FIG. 7 shows an example of different domains and processing states of the processing circuitry, in accordance with one example implementation, and indicates how capability generation abilities may be provided when the processing circuitry is operating in one or more particular combinations of domain and processing state.

FIG. 7 is a diagram schematically illustrating various different mode levels of trust that may exist within a system, and indicates the capability generation abilities that may be supported in such an arrangement. As shown in FIG. 7, the processing circuitry may be arranged to operate in a secure domain and a less secure domain, and the current mode level of trust may be dependent on which of those security domains the current program code is executed in. In addition, or alternatively, the processing circuitry may be arranged to execute program code in a plurality of different states, and in the example of FIG. 7 may be arranged to operate program code in a privileged state or an unprivileged state. The levels of privilege and the different security domains can be viewed as being orthogonal levels of trust, and a different mode level of trust of the processing circuitry may be associated with each combination of secure/less secure domain and privileged/unprivileged state. Hence, as shown in FIG. 7, there may be four different levels of trust in the example shown.

With regard to the earlier-described limited forging rights enabling capabilities to be generated, then, as shown by the arrows in FIG. 7, when the processing circuitry is operating in the secure and privileged mode, it may be able to generate capabilities for any of the other three lower trust level modes of operation. Similarly, when the processing circuitry is operating in the less secure privileged mode, it may still be given limited forging rights to enable it to generate capabilities for the less secure unprivileged mode. Further, if desired, when the processing circuitry is operating in the secure unprivileged mode, it may still be given limited forging rights to enable it to generate capabilities for the less secure unprivileged mode.

Whilst FIG. 7 shows four different levels of trust, it will be appreciated that the techniques described herein are not limited to such a configuration, and additional levels of trust, in either or both of the orthogonal directions shown in FIG. 7, may be provided. The privileged and unprivileged modes of operation can take a variety of forms, but purely by way of example the privileged mode may in some implementations be referred to as a handler mode and the unprivileged mode may be referred to as a thread mode. The handler mode is typically used for exception processing, and hence for example a trusted exception handling routine may be executed in the handler mode. The thread mode is typically used for running different threads, for example different application threads.

Figure 8A:
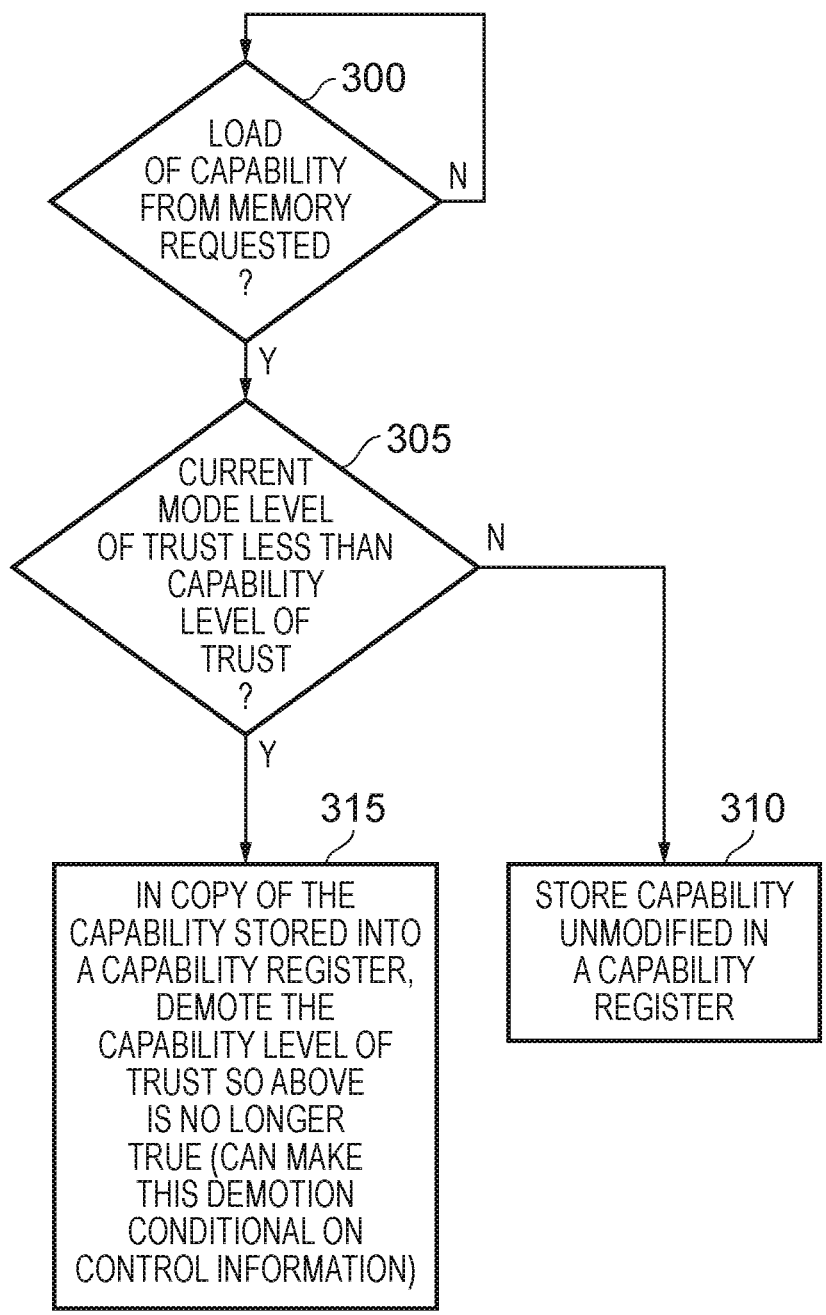
FIG. 8A is a flow diagram illustrating steps performed in order to load a capability from memory, in accordance with one example implementation.

When loading capabilities from memory into one of the capability registers 60, 80, the processing circuitry may be arranged to selectively modify the capability level of trust in certain situations, one example implementation of this approach being shown in FIG. 8A. At step 300, it is determined whether a load of a capability from memory is requested, and if so it is then determined at step 305 whether the current mode level of trust is less than the capability level of trust of the capability that is to be loaded from memory. If not, then in one example implementation the process proceeds to step 310 where the capability is stored unmodified within the capability register.

However, in accordance with the technique shown in FIG. 8A, if the current mode level of trust is less than the capability level of trust, then the process proceeds to step 315, where the capability level of trust associated with the copy of the capability that is being stored into the capability register is demoted so that the current mode level of trust is no longer less than the capability level of trust. By such an approach, it can be ensured that even if the capability being loaded from memory has a higher associated level of privilege, the resulting capability that is loaded into the processing circuitry's capability register will have its capability level of trust demoted so that it could not be used to access memory that should not be accessed by the processing circuitry when operating with the current mode level of trust. Conversely, if the capability in memory has a lower level of trust than the current mode level of trust, its level of trust stays "as is" as it is moved into the capability register. This can avoid accidental promotion of capabilities, for example avoiding the case of an exception handler accidentally promoting stacked values.

In one example implementation it is possible for the capability loading process to be used in certain situations to load general purpose data into a capability register rather than a capability. This can be detected at step 300, and if in fact the load operation is being used to load general purpose data, then the selective demotion of the bits that would specify the capability level of trust within a capability can be prevented, thus avoiding corruption of the data being loaded.

As indicated by step 315 in FIG. 8A, the ability to selectively demote capability levels of trust can be made configurable, for example by making it conditional on control information stored within the control registers 90. The selective demotion of capabilities could also be disabled for certain types of capabilities, and hence for example could be disabled when the capability being loaded is an immutable capability. Such an ability could be beneficial, for example to allow the spilling of privileged immutable capabilities from within an unprivileged mode of operation without modifying the immutable capability. Further, whilst as mentioned above the control information used to conditionally enable or disable the selective demotion of capabilities being loaded from memory can be stored in the control registers, that control information could also be stored elsewhere, for example as a field within the capability itself, or so as to enable demotion to be based, for example, on MPU region attributes. With this latter approach, the mechanism could be arranged so that if a capability is loaded from an MPU region marked as read-only (e.g. code memory) the demotion would occur, but would not occur if the relevant region is marked as read-write (e.g. a heap or stack memory). In some implementations a dedicated control bit in the MPU could be used to dictate the behaviour.

Figure 8B:
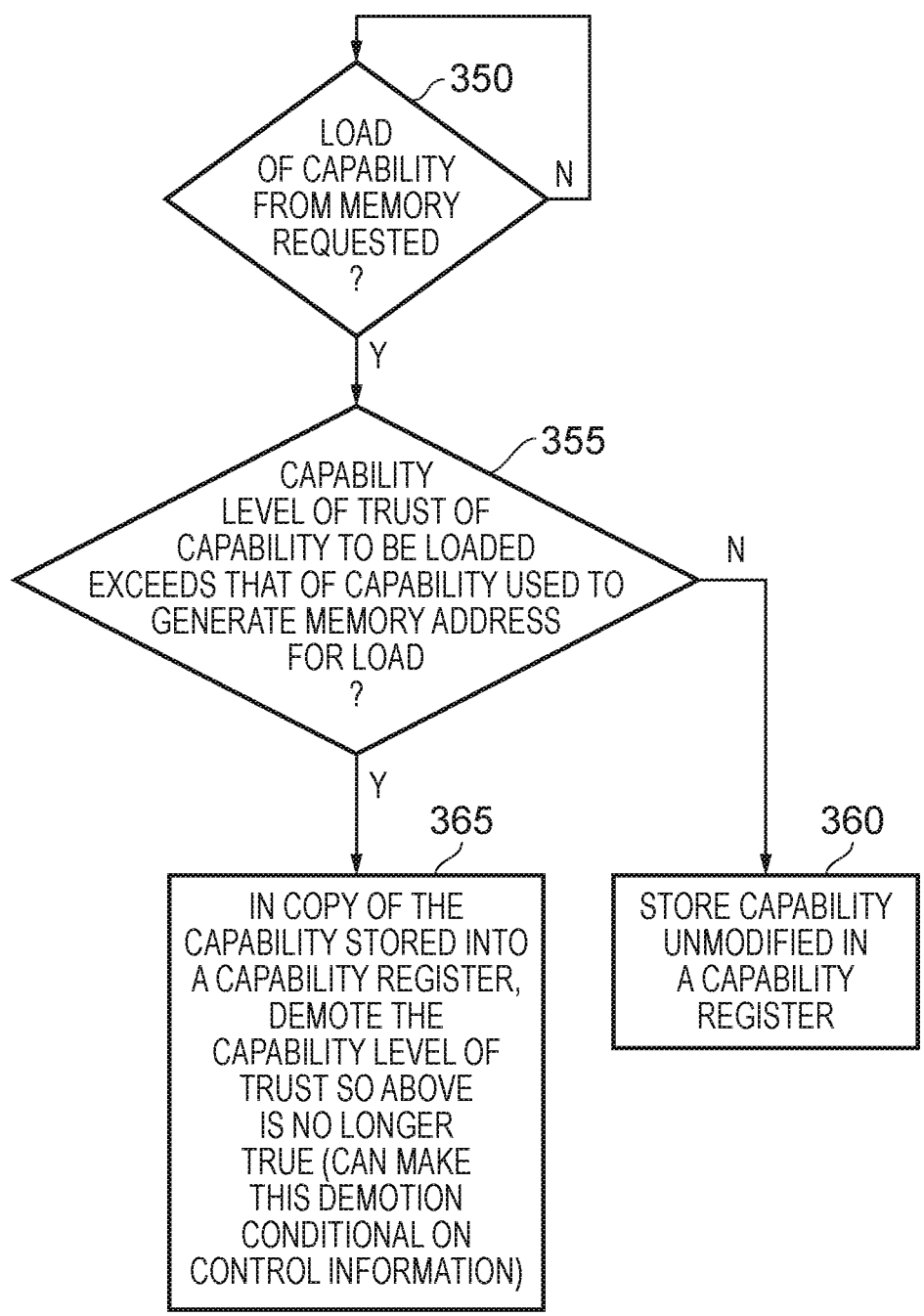
FIG. 8B is a flow diagram illustrating steps performed in order to load a capability from memory, in accordance with a further example implementation.

Whilst FIG. 8A illustrates one mechanism that may be used to selectively demote capability level of trust when loading a capability into a capability register from memory, other mechanisms can be used if desired. FIG. 8B illustrates an alternative mechanism where the selective demotion is based on the capability level of trust of the capability that is used to generate the memory address for the load. In particular, as shown in FIG. 8B, when at step 350 it is determined that a load of a capability from memory is required, then at step 355 it is determined whether the capability level of trust of the capability to be loaded exceeds the capability level of trust of the capability that is used to generate the memory address for the load. Provided this is not the case then the capability is stored unmodified in the capability register at step 360, but if this is the case then the capability of level of trust of the capability being loaded into the capability register is demoted so that its level of trust no longer exceeds the level of trust of the capability used to generate the memory address for the load. As with the earlier discussion of FIG. 8, this selective demotion functionality can be made conditional on control information.

Whilst the process of FIG. 8B can be used as an alternative to the process of FIG. 8A, in one example implementation the techniques are combined so that both checks are performed. Accordingly, it will be appreciated that the capability level of trust of the capability being loaded is then selectively demoted to be the minimum of the current mode level of trust associated with the current mode of operation of the processing circuitry and the capability level of trust of the capability that is used to generate the memory address for the load.

Figure 9:
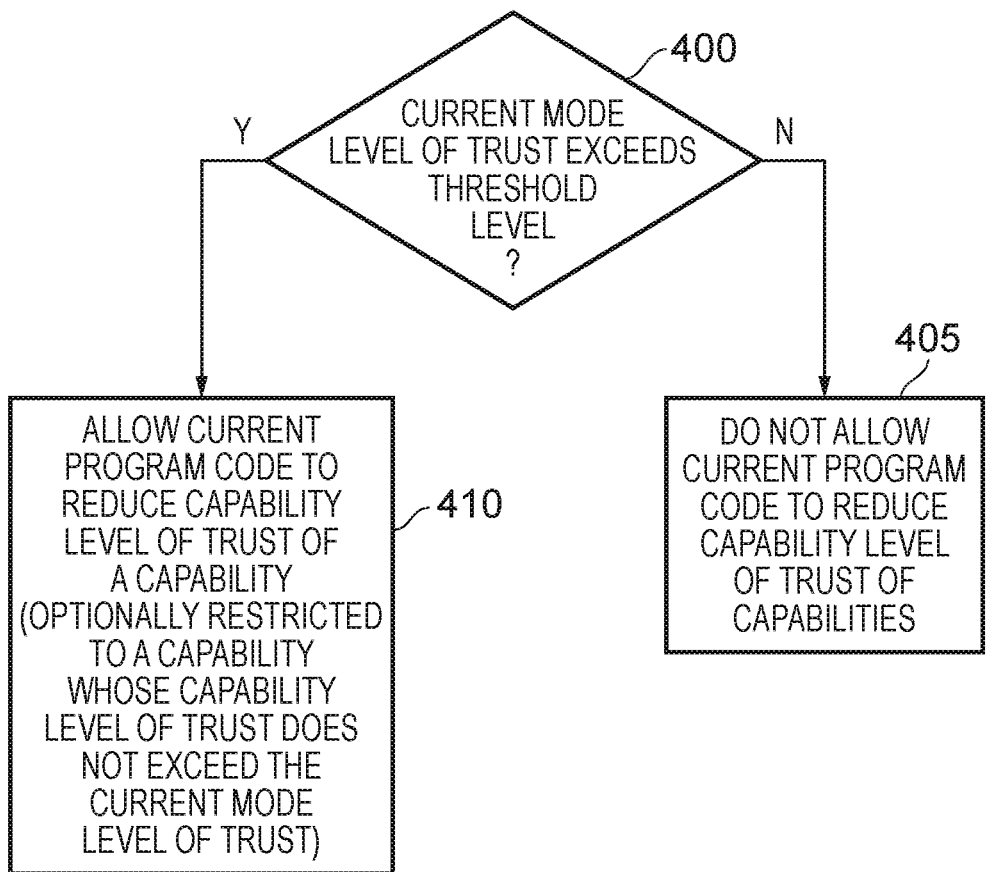
FIG. 9 is a flow diagram illustrating how the ability to reduce a capability level of trust of a capability can be made dependent on a current mode level of trust associated with the current mode of operation of the processing circuitry, in accordance with one example implementation.

FIG. 9 is a flow diagram illustrating how, in one example implementation, the processing circuitry may, at least in certain modes of operation, be allowed to reduce the capability level of trust of capabilities. At step 400, it is determined whether the current mode level of trust of the processing circuitry exceeds a threshold level, and if not at step 405 current program code executed by the processing circuitry is not allowed to reduce the capability level of trust of the capabilities. Conversely, provided the current mode level of trust does exceed the threshold level, then at step 410 the current program code executing on the processing circuitry is allowed to reduce the capability level of trust of capabilities. Optionally, this ability can be restricted to a capability whose capability level of trust does not exceed the current mode level of trust.

Whilst in FIG. 9 the ability to reduce the capability level of trust of a capability is limited to certain mode levels of trust, this is not a requirement and in alternative implementations the processing circuitry may be permitted to demote the capability level of trust irrespective of the current mode level of trust.

In one example implementation, prior to the apparatus entering capability mode whereby accesses are constrained using capabilities, the apparatus may be provided with one or more initial capabilities. Typically, these initial capabilities can be set to have a capability level of trust that indicates a highest level of trust supported by the apparatus when operating in the capability mode. This is a safe approach, since when using the selective demotion of capabilities loaded from memory discussed earlier, this enables the capability level of trust of those initial capabilities to be selectively demoted as required when loaded into the capability registers, dependent for example on the current mode of operation of the processing circuitry.

Figure 10:
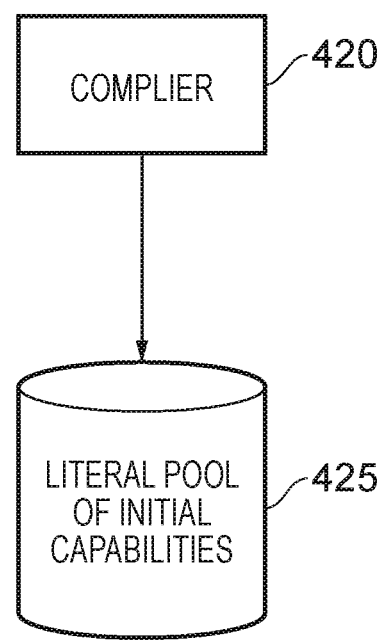
FIG. 10 schematically illustrates how a compiler may be used to generate a set of initial capabilities, in accordance with one example implementation.

The initial capabilities can be established in a variety of ways, but as illustrated in FIG. 10 in one example implementation a compiler 420 can be used to define the initial capabilities during the compilation of the program code to be executed on the apparatus, with those generated initial capabilities being stored as a literal pool of initial capabilities 425 within memory.

As mentioned earlier, whilst in one example implementation the initial capabilities may all be set to have the highest capability level of trust supported by the apparatus when operating in capability mode, if desired the developer could create one or more capabilities that have a lower capability level of trust. For example, where the developer knows that the capability should always be unprivileged (for instance in OS management code) compiler intrinsics can be used to create a capability that is marked as unprivileged in the static data, thus further enhancing security.

In some example implementations, the capabilities may include at least one immutable capability whose constraining information is identified as immutable. Typically this would mean that the processing circuitry would not be able to change the constraining information once the capability has been established. However, in accordance with one example implementation as schematically illustrated by the flow diagram of FIG. 11, it is possible in certain situations to allow the constraining information of a chosen immutable capability to be modified. At step 450, it is detected when an attempt is being made to modify an immutable capability. In such a situation, then at step 455 it is determined whether the current mode level of trust of the processing circuitry exceeds the capability level of trust of the immutable capability. If not, then at step 460 the modification is prevented. In addition, the tag bit could be cleared in such situations so that the capability is no longer valid.

However, if at step 455 it is determined that the current mode level of trust exceeds the capability level of trust of the immutable capability, then at step 465 modification of the immutable capability is allowed.

Figure 11:
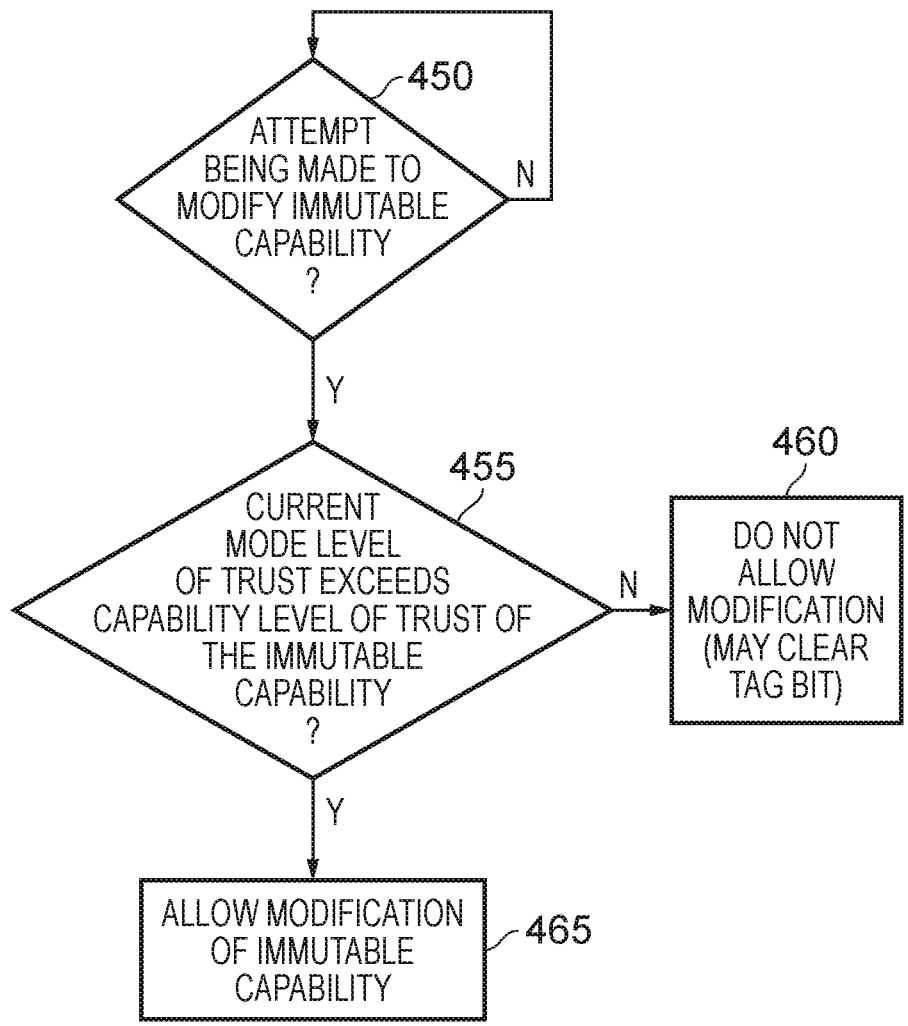
FIG. 11 is a flow diagram illustrating a process that may be employed in one example implementation in order to determine whether to selectively allow modification of immutable capabilities.

Whilst the functionality of FIG. 11 could be allowed in all instances, if desired the ability to perform the function of FIG. 11 could be further restricted, for example by checking whether the current mode level of trust of the processing circuitry exceeds a threshold level.

Further, it should be noted that the selective modification of immutable capabilities could be handled in other manners, and is not restricted to the approach set out in FIG. 11. For example, in one implementation the modification of immutable capabilities may generically be allowed, but the tag bit would be cleared in situations where the level of trust criteria of step 455 are not met, hence effectively invalidating the capability. As a further alternative, the modification may be performed, but if necessary the capability level of trust of the modified immutable capability could be demoted so that the level of trust criteria of step 455 are met.

Figure 12:
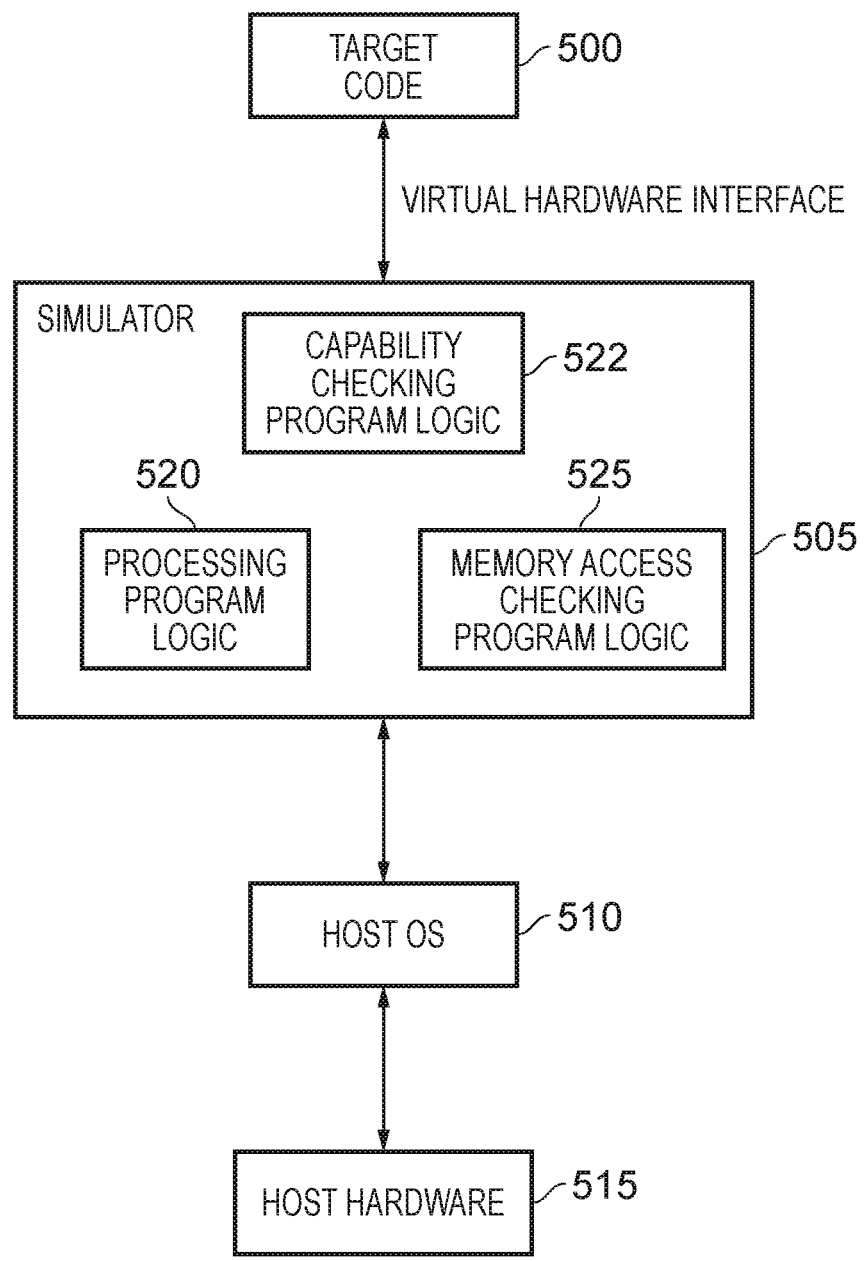
FIG. 12 shows a simulator example that can be used.

FIG. 12 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically a simulator implementation may run on a host processor 515, optionally running a host operating system 510, supporting the simulator program 505. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 50 in the hardware apparatus 2 could be emulated as a simulated address space which is mapped on to the virtual address space used by the host operating system 510 by the simulator 505. In arrangements where one or more of the hardware elements referenced in the previously described examples are present on the host hardware (for example host processor 515), some simulated implementations may make use of the host hardware, where suitable.

The simulator program 505 may be stored on a computer readable storage medium (which may be a non-transitory medium), and provides a virtual hardware interface (instruction execution environment) to the target code 500 (which may include applications, operating systems and a hypervisor) which is the same as the hardware interface of the hardware architecture being modelled by the simulator program 505. Thus, the program instructions of the target code 500 may be executed from within the instruction execution environment using the simulator program 505, so that a host computer 515 which does not actually have the hardware features of the apparatus 2 discussed above can emulate those features. The simulator program may include processing program logic 520 to emulate the behaviour of the processing pipeline 4, capability checking program logic 522 to emulate the behaviour of the capability checking circuitry 33, and memory access checking program logic 525 to emulate behaviour of the memory access checking circuitry 52 of the hardware apparatus 2 of FIG. 1. Hence, the techniques described herein for managing capabilities and their associated capability levels of trust can in the example of FIG. 12 be performed in software by the simulator program 505.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform operations during which access requests to memory are generated, wherein the processing circuitry is arranged to generate memory addresses for the access requests using capabilities that identify constraining information;
capability checking circuitry to perform a capability check operation to determine whether a given access request whose memory address is generated using a given capability is permitted based on the constraining information identified by that given capability; and
memory access checking circuitry to further constrain access to the memory by the given access request in dependence on a level of trust associated with the given access request;
wherein:
the given capability has a capability level of trust associated therewith, and the level of trust associated with the given access request is dependent on both a current mode level of trust associated with a current mode of operation of the processing circuitry, and the capability level of trust of the given capability.

2. The apparatus as claimed in claim 1, wherein the level of trust associated with the given access request is constrained to be whichever of the current mode level of trust and the capability level of trust represents a lower level of trust.

3. The apparatus as claimed in claim 1, wherein the capability level of trust is encoded within the given capability.

4. The apparatus as claimed in claim 3, wherein:
for each capability, the constraining information provides at least a set of permissions identifying types of memory accesses permitted to memory addresses generated using that capability; and
the capability level of trust is provided as an additional permission.

5. The apparatus as claimed in claim 1, wherein the given capability provides an identifier indicative of a location containing the capability level of trust.

6. The apparatus as claimed in claim 1 wherein:
for each capability, the constraining information further provides bounds information used to determine an allowable range of memory addresses for the memory address generated for any access request using that capability.

7. The apparatus as claimed in claim 1, wherein the processing circuitry comprises capability generating circuitry arranged, at least when the current mode level of trust exceeds a threshold level of trust, to perform a capability generation operation to generate a capability and to set the associated capability level of trust for the generated capability to indicate a level of trust lower than the current mode level of trust.

8. The apparatus as claimed in claim 1, wherein the processing circuitry comprises capability generating circuitry arranged to perform a capability generation operation to generate a capability from source data, provided the current mode level of trust exceeds a capability level of trust indication provided in association with the source data.

9. The apparatus as claimed in claim 7, wherein:
the processing circuitry is arranged to execute program instructions, with the processing of the program instructions being constrained by a prevailing capability;
the processing circuitry further comprises control flow change handling circuitry to perform a control flow change operation, the control flow change operation defining a control flow change target address indicating the address of a program instruction for execution after the control flow change operation; and the capability generating circuitry is arranged to determine, in dependence on the control flow change target address, an address at which capability constraining information is stored, to retrieve the capability constraining information, and to generate a capability for use as a next prevailing capability in dependence upon at least the capability constraining information, and with the associated capability level of trust for the generated capability constrained to indicate a level of trust lower than the current mode level of trust.

10. The apparatus as claimed in claim 1, further comprising:

a set of capability registers to store capabilities for reference by the processing circuitry; and memory circuitry to store one or more capabilities;

wherein:

the processing circuitry is arranged to perform a load operation to load a chosen capability from the memory circuitry into a selected capability register from the set of capability registers; and the processing circuitry is arranged, during the load operation, to selectively modify the capability level of trust such that the chosen capability as stored into the selected capability register has a capability level of trust constrained not to exceed the current mode level of trust or the capability level of trust of the chosen capability as stored in the memory circuitry.

11. The apparatus as claimed claim 10, wherein the processing circuitry is arranged to only selectively modify the capability level of trust during the load operation when the chosen capability has a control value identifying that the chosen capability is a valid capability.

12. The apparatus as claimed in claim 10, wherein when the current mode level of trust is less than the capability level of trust of the chosen capability as stored in the memory circuitry, the processing circuitry is arranged to demote the capability level of trust of the chosen capability as stored into the selected capability register to match the current mode level of trust.

13. The apparatus as claimed in claim 10, wherein when the current mode level of trust is the same or greater than the capability level of trust of the chosen capability as stored in the memory circuitry, the processing circuitry is arranged to leave unchanged the capability level of trust when the chosen capability is stored into the selected capability register.

14. The apparatus as claimed in claim 1, wherein, at least when the current mode level of trust exceeds a threshold level of trust, the processing circuitry is arranged to allow the capability level of trust of a chosen capability to be reduced from its current capability level of trust.

15. The apparatus as claimed in claim 1, wherein:

the processing circuitry is arranged to execute program code in one of a plurality of states comprising at least a privileged state and an unprivileged state, and the current mode level of trust is dependent on which of the plurality of states the current program code is executed in.

16. The apparatus as claimed in claim 1, wherein the processing circuitry is arranged to execute program code in one of a plurality of security domains comprising at least a secure domain and a less secure domain, and the current mode level of trust is dependent on which of the plurality of security domains the current program code is executed in.

17. The apparatus as claimed in claim 15, wherein the processing circuitry is further arranged to execute program code in one of a plurality of security domains comprising at least a secure domain and a less secure domain, and the current mode level of trust is dependent on both the state and the security domain that the current program code is executed in.

18. The apparatus as claimed in claim 1, wherein:

the capabilities include at least one immutable capability whose constraining information is identified as immutable; and at least when the current mode level of trust exceeds a threshold level of trust, the processing circuitry is arranged to allow the constraining information of a chosen immutable capability to be modified provided that chosen immutable capability has a capability level of trust less than the current mode level of trust.

19. A method of constraining access to memory, comprising:

employing processing circuitry to perform operations during which access requests to memory are generated, wherein the processing circuitry generates memory addresses for the access requests using capabilities that identify constraining information;

performing a capability check operation to determine whether a given access request whose memory address is generated using a given capability is permitted based on the constraining information identified by that given capability; and further constraining access to the memory by the given access request in dependence on a level of trust associated with the given access request, wherein the given capability has a capability level of trust associated therewith, and the level of trust associated with the given access request is dependent on both a current mode level of trust associated with a current mode of operation of the processing circuitry, and the capability level of trust of the given capability.

20. A non-transitory computer-readable storage medium storing a computer program for controlling a host data processing apparatus to provide an instruction execution environment, comprising:

processing program logic to perform operations during which access requests to memory are generated, wherein the processing program logic is arranged to generate memory addresses for the access requests using capabilities that identify constraining information;

capability checking program logic to perform a capability check operation to determine whether a given access request whose memory address is generated using a given capability is permitted based on the constraining information identified by that given capability; and memory access checking program logic to further constrain access to the memory by the given access request in dependence on a level of trust associated with the given access request;

wherein:

the given capability has a capability level of trust associated therewith, and the level of trust associated with the given access request is dependent on both a current mode level of trust associated with a current mode of operation of the processing program logic, and the capability level of trust of the given capability.

* * * * *